(12) United States Patent
Herzi

(10) Patent No.: US 9,772,863 B2
(45) Date of Patent: Sep. 26, 2017

(54) METHODS FOR COPYING INFORMATION HANDLING SYSTEM CONFIGURATION SETTINGS

(71) Applicant: Dell Products, L.P., Round Rock, TX (US)

(72) Inventor: Dirie N. Herzi, Leander, TX (US)

(73) Assignee: Dell Products, L.P., Round Rock, TX (US)

(*) Notice: Subject to any disclaimer, the term of this patent is extended or adjusted under 35 U.S.C. 154(b) by 162 days.

(21) Appl. No.: 14/515,286

(22) Filed: Oct. 15, 2014

(65) Prior Publication Data
US 2016/0110207 A1 Apr. 21, 2016

(51) Int. Cl.
*G06F 9/445* (2006.01)

(52) U.S. Cl.
CPC .................. *G06F 9/44505* (2013.01)

(58) Field of Classification Search
None
See application file for complete search history.

(56) References Cited

U.S. PATENT DOCUMENTS

| | | | |
|---|---|---|---|
| 6,170,056 B1* | 1/2001 | Sidie | G06F 9/44505 710/220 |
| 2005/0076002 A1* | 4/2005 | Williams | G06F 9/44505 |
| 2005/0138348 A1* | 6/2005 | Bolay | G06F 9/44505 713/100 |
| 2005/0193187 A1* | 9/2005 | Harada | G06F 3/0607 713/1 |
| 2006/0020844 A1* | 1/2006 | Gibbons | G06F 11/142 714/2 |
| 2006/0208088 A1* | 9/2006 | Sekiguchi | G06K 7/1095 235/472.02 |
| 2013/0169996 A1* | 7/2013 | McLeod | G06K 7/1092 358/3.28 |
| 2014/0368653 A1* | 12/2014 | Wang | G06F 13/24 348/148 |
| 2015/0052361 A1* | 2/2015 | Winkler-Teufel | G06F 9/44505 713/171 |

* cited by examiner

*Primary Examiner* — Paul J Yen
(74) *Attorney, Agent, or Firm* — Norton Rose Fulbright US LLP

(57) ABSTRACT

Copying information handling system (IHS) configuration settings between information handling devices may include a first logic unit of a first IHS generating an encoded Quick Response (QR) code corresponding to one or more information handling system configuration settings of the first IHS. A display connected to the first IHS may display the QR code. A camera connected to a second IHS may read an image of the QR code. A second logic unit of the second IHS may decode the information handling system configuration settings from the QR code. The second logic unit may adjust the information handling system configuration settings of the second IHS to match the information handling system configuration settings from the first IHS. In one embodiment the camera may read the image of the QR code from a display of a mobile device held within a field of view of the camera by a user.

14 Claims, 6 Drawing Sheets

METHODS FOR COPYING INFORMATION HANDLING SYSTEM CONFIGURATION SETTINGS

FIELD

This disclosure relates generally to information handling systems, and more specifically, to methods for copying Information Handling System (IHS) configuration settings.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a firmware interface between the software operating system (OS) and firmware. Examples of firmware interfaces include BIOS and the Unified Extensible Firmware Interface (UEFI). Information handling systems use BIOS or UEFI interfaces to control system configuration settings, which are stored in local memory and referenced when the information handling system performs startup and other functions. In some cases it may be desirable to copy the BIOS settings from one information handling system to another. However, conventional methods of copying BIOS settings are inefficient. For example, a user must boot the first information handling system to initialize the OS and then run a custom application to save the configuration. After saving the configuration, the user must then boot the second OS and run a script to update the BIOS configuration of the second system. This method is time consuming, particularly if the BIOS settings are being copied to several different information handling systems.

SUMMARY

In one embodiment a method for copying information handling system configuration settings between information handling devices may include a first logic unit of a first information handling device generating an encoded Quick Response (QR) code that corresponds to one or more information handling system configuration settings of the first information handling device. A display connected to the first information handling device may display the QR code. A second information handling device may enter a configuration mode. A camera connected to the second information handling device may be configured to read an image of the QR code. A second logic unit of the second information handling device may be configured to decode the one or more information handling system configuration settings from the QR code. The second logic unit may compare each of the one or more information handling system configuration settings from the first information handling device to one or more current information handling system configuration settings of the second information handling device. The second logic unit may adjust the information handling system configuration settings of the second information handling device to match the one or more information handling system configuration settings from the first information handling device. In one embodiment the camera may read the image of the QR code from a display of a mobile device held within a field of view of the camera by a user. In another embodiment the second logic unit may send a signal to reboot the second information handling device.

In an embodiment the one or more information handling system configuration settings may include Basic Input/Output System (BIOS) settings. In another embodiment the one or more information handling system configuration settings may include Baseboard Management Controller (BMC) settings. In yet another embodiment the one or more information handling system configuration settings may include modular server management controller settings. In one embodiment the first logic unit may refresh the QR code in real time in response to changes in the one or more information handling system configuration settings of the first information handling device. In an embodiment the first logic unit may generate the QR code in response to a scan of configuration data from a Unified Extensible Firmware Interface (UEFI) Human Interface Infrastructure (HII) database.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
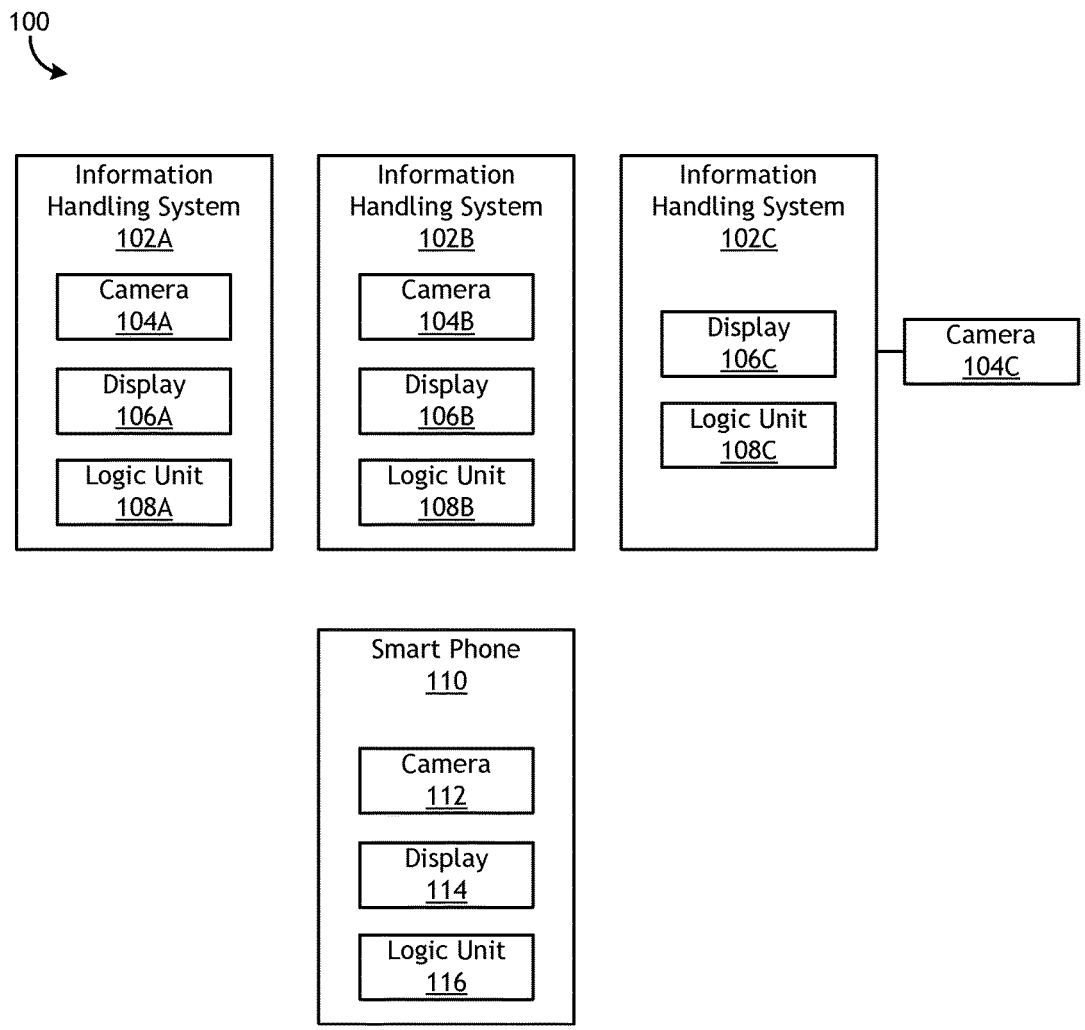
FIG. 1 is a schematic block diagram illustrating one embodiment of a system to copy IHS configuration information.

Embodiments of methods and systems for a method to copy IHS configuration information are described. In an embodiment, one or more IHS configuration settings of a first information handling system are represented by an encoded Quick Response (QR) code, which facilitates efficient copying of the IHS configuration information settings from the first information handling system to one or more additional information handling systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In one embodiment, a logic unit of the first information handling device generates an encoded QR code that represents the IHS configuration information settings of the first information handling device. The QR code may be displayed along with a list of the BIOS settings in a BIOS setup mode. A user may then utilize a mobile device, such as a smart phone or tablet to take a picture of the QR code from the display of the first information handling system. In order to transfer the BIOS settings to another information handling system, the user may then hold the picture of the QR code within the field of view of a camera of the other information handling system. A logic unit of the other information handling system then decodes the QR code and adjusts the information handling system's BIOS settings accordingly to match the BIOS settings of the first information handling system.

Encoding the BIOS configuration settings of an information handling system into a QR code thus enables a user to efficiently copy the BIOS settings to one or more additional information handling systems in a fast and efficient manner by taking a picture of the QR code and holding the picture up to the camera of each information handling system that the user would like to transfer the BIOS settings to. This method saves time since the user does not need to install and/or execute a custom script or application, as in conventional methods. Furthermore, in one embodiment the first information handling system may refresh the QR code in real time in response to any changes to the BIOS settings of the first information handling system, thereby enabling the user to begin copying the updated settings by taking a new picture with a mobile device having a camera.

FIG. 1 is a schematic block diagram illustrating one embodiment of an information handling system 100 to copy IHS configuration information. In one embodiment information handling system 100 may include a first IHS 102A and one or more additional IHS(s), such as IHS 102B and IHS 102C. IHS(s) 102A-C may be desktop computer systems, laptop computers, servers, or the like. The first IHS 102A may include an integrated camera 104A, a display 106A, and a logic unit 108A. Similarly, IHS 102B may include a camera 104B, a display 106B, and a logic unit 108B. In an embodiment a unit, such as IHS 102C, may include a display 106C and a logic unit 108C, while having an externally-connected camera 104C. In one embodiment IHS 102C may be a blade server, and externally-connected camera 104C may be connected to IHS 102C via a Universal Serial Bus (USB) port.

In an embodiment, information handling system 100 may also include a mobile device, such as smart phone 110. Smart phone 110 may include a camera 112, a display 114, and a logic unit 116. Smart phone 110 may be used to capture a picture of a QR code, as discussed in further detail in the figures below. In another embodiment the mobile device may be a tablet computer or other type of portable device having a camera input device and a display output device.

Figure 2:
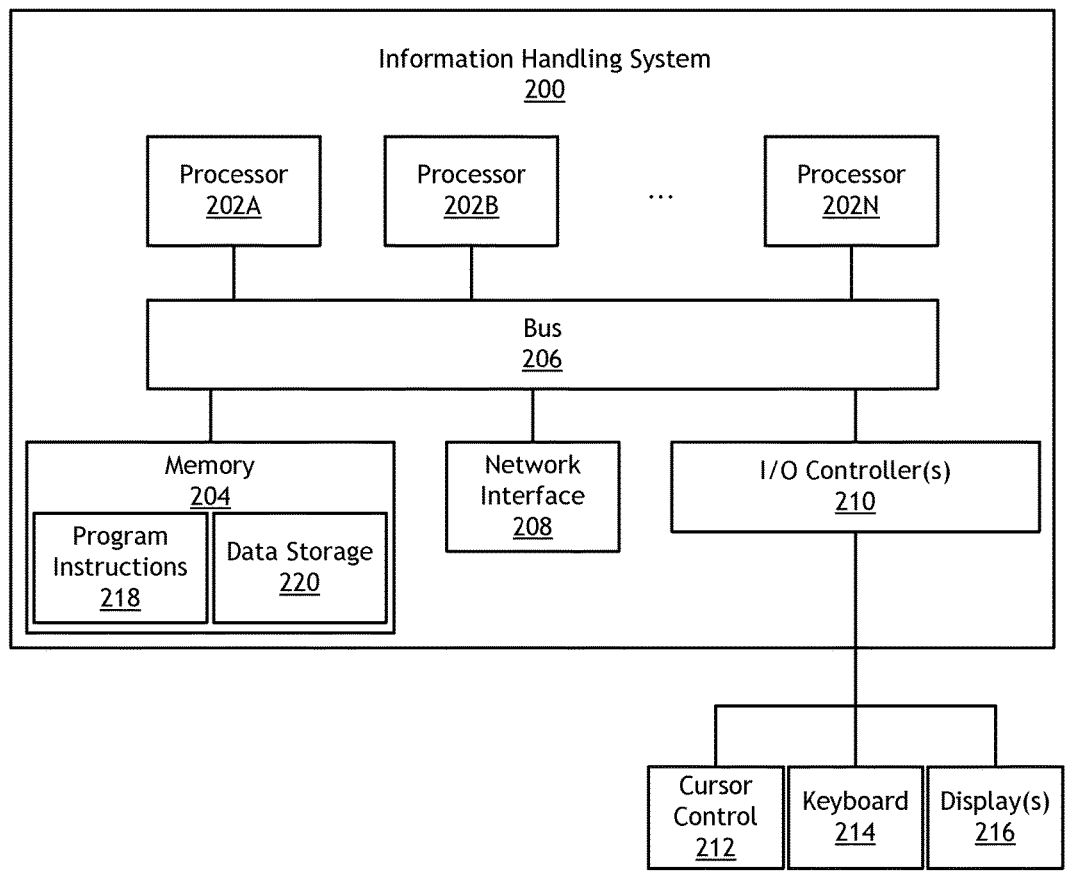
FIG. 2 is a schematic block diagram illustrating one embodiment of an information handling system configured to copy IHS configuration information.

FIG. 2 is a schematic block diagram illustrating one embodiment of an IHS 200 configured to copy IHS configuration information. In one embodiment, the first IHS 102A may be implemented on an information handling system similar to the IHS 200 described in FIG. 2. Similarly, one or more additional IHS(s) 102B and/or 102C may be implemented on an information handling system similar to the IHS 200 described in FIG. 2. Smart phone 110 may also be implemented on an information handling system similar to the IHS 200. In various embodiments, IHS 200 may be a server, a mainframe computer system, a workstation, a network computer, a desktop computer, a laptop, or the like.

As illustrated, IHS 200 includes one or more processors 202A-N coupled to a system memory 204 via bus 206. IHS 200 further includes network interface 208 coupled to bus 206, and input/output (I/O) controller(s) 210, coupled to devices such as cursor control device 212, keyboard 214, and display(s) 216. In some embodiments, a given entity (e.g., IHS 102A may be implemented using a single instance of IHS 200, while in other embodiments multiple such information handling systems, or multiple nodes making up IHS 200, may be configured to host different portions or instances of embodiments (e.g., IHS(s) 102B and/or 102C).

In various embodiments, IHS 200 may be a single-processor information handling system including one processor 202A, or a multi-processor system including two or more processors 202A-N (e.g., two, four, eight, or another suitable number). Processor(s) 202A-N may be any processor capable of executing program instructions. For example, in various embodiments, processor(s) 202A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 202A-N may commonly, but not necessarily, implement the same ISA. Also, in some embodiments, at least one processor(s) 202A-N may be a graphics processing unit (GPU) or other dedicated graphics-rendering device.

System memory 204 may be configured to store program instructions and/or data accessible by processor(s) 202A-N. For example, memory 204 may be used to store software program and/or database shown in FIG. 3, FIG. 4, FIG. 5, and/or FIG. 6. In various embodiments, system memory 204 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 204 as program instructions 218 and data storage 220, respectively. In other embodiments, program instructions and/or data may be received, sent or stored upon different types of IHS-accessible media or on similar media separate from system memory 204 or IHS 200. Generally speaking, a IHS-accessible medium may include any tangible, non-transitory storage media or memory media such as electronic, magnetic, or optical media—e.g., disk or CD/DVD-ROM coupled to IHS 200 via bus 206, or non-volatile memory storage (e.g., "flash" memory)

The terms "tangible" and "non-transitory," as used herein, are intended to describe an IHS-readable storage medium (or "memory") excluding propagating electromagnetic signals, but are not intended to otherwise limit the type of physical IHS-readable storage device that is encompassed by the phrase IHS-readable medium or memory. For instance, the terms "non-transitory IHS readable medium" or "tangible memory" are intended to encompass types of storage devices that do not necessarily store information permanently, including for example, random access memory (RAM). Program instructions and data stored on a tangible IHS-accessible storage medium in non-transitory form may further be transmitted by transmission media or signals such as electrical, electromagnetic, or digital signals, which may be conveyed via a communication medium such as a network and/or a wireless link.

In an embodiment, bus 206 may be configured to coordinate I/O traffic between processor 202, system memory 204, and any peripheral devices including network interface 208 or other peripheral interfaces, connected via I/O controller(s) 210. In some embodiments, bus 206 may perform any necessary protocol, timing or other data transformations to convert data signals from one component (e.g., system memory 204) into a format suitable for use by another component (e.g., processor(s) 202A-N). In some embodiments, bus 206 may include support for devices attached through various types of peripheral buses, such as a variant of the Peripheral Component Interconnect (PCI) bus standard or the Universal Serial Bus (USB) standard, for example. In some embodiments, the operations of bus 206 may be split into two or more separate components, such as a north bridge and a south bridge, for example. In addition, in some embodiments some or all of the operations of bus 206, such as an interface to system memory 204, may be incorporated directly into processor(s) 202A-N.

Network interface 208 may be configured to allow data to be exchanged between IHS 200 and other devices, such as smart phone 110 for example. In various embodiments, network interface 208 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 210 may, in some embodiments, enable connection to one or more display terminals, keyboards, keypads, touch screens, scanning devices, voice or optical recognition devices, or any other devices suitable for entering or retrieving data by one or more IHS 200. Multiple input/output devices may be present in IHS 200 or may be distributed on various nodes of IHS 200. In some embodiments, similar I/O devices may be separate from IHS 200 and may interact with IHS 200 through a wired or wireless connection, such as over network interface 208.

As shown in FIG. 2, memory 204 may include program instructions 218, configured to implement certain embodiments described herein, and data storage 220, comprising various data accessible by program instructions 218. In an embodiment, program instructions 218 may include software elements of embodiments illustrated in FIG. 3, FIG. 4, FIG. 5, and/or FIG. 6. For example, program instructions 218 may be implemented in various embodiments using any desired programming language, scripting language, or combination of programming languages and/or scripting languages. Data storage 220 may include data that may be used in these embodiments such as, for example, IHS(s) 102A-C. In other embodiments, other or different software elements and data may be included.

A person of ordinary skill in the art will appreciate that IHS 200 is merely illustrative and is not intended to limit the scope of the disclosure described herein. In particular, the information handling system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, information handling systems and methods described herein may be implemented or executed with other information handling system configurations.

Embodiments of IHS(s) 102A-C described in FIG. 1 may be implemented in an information handling system that is similar to IHS 200. In one embodiment, the elements described in FIG. 1 may be implemented in discrete hardware modules. Alternatively, the elements may be implemented in software-defined modules which are executable by one or more of processors 202A-N, for example.

Figure 3:
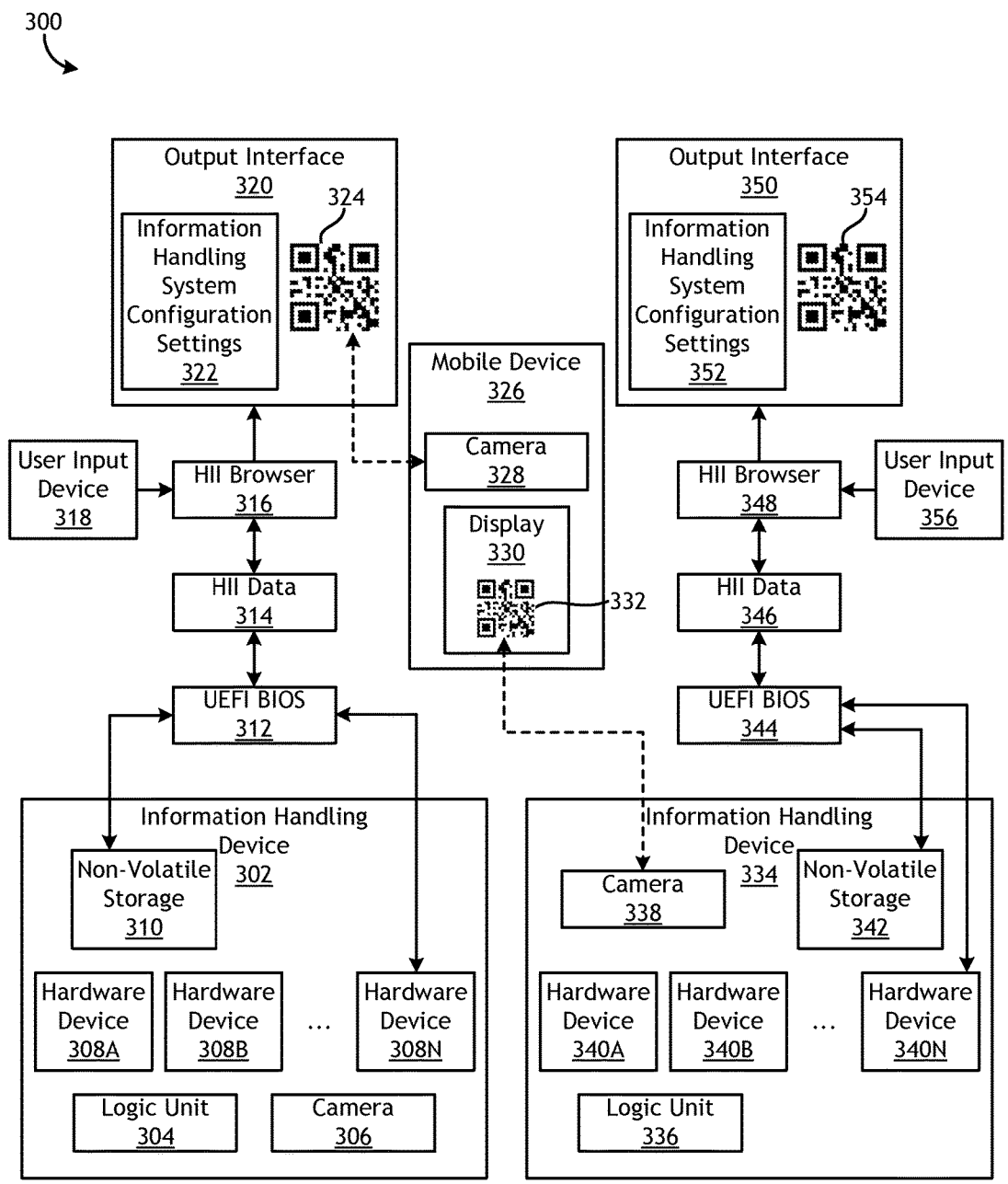
FIG. 3 is a schematic block diagram illustrating one embodiment of an apparatus to copy IHS configuration information.

FIG. 3 is a schematic block diagram illustrating one embodiment of an apparatus 300 to copy IHS configuration information between information handling devices, such as first information handling device 302 and second information handling device 334. In one embodiment apparatus 300 may include a first logic unit 304 configured to generate an encoded QR code 324 corresponding to one or more information handling system configuration settings 322 of the first information handling device 302. Apparatus 300 may also include an output interface 320 coupled to logic unit 304, and the output interface 320 may be configured to generate an output including the QR code 324.

In an embodiment, information handling device 302 may also include camera 306, one or more hardware devices 308A-N, and a memory unit, such as non-volatile storage 310. Logic unit 304 may interface with hardware devices 308A-N, non-volatile storage 310, a user input device 318, and/or output interface 320 via a software stack. In one embodiment the software stack may include UEFI BIOS 312, Human Interface Infrastructure (HII) data 314, and a HII browser 316. In an embodiment, the information handling system configuration settings 332 corresponding to UEFI BIOS 312 may be stored in non-volatile storage 310.

Similarly, in one embodiment a second information handling device 334 may include logic unit 336, one or more hardware devices 340A-N, camera 338, and non-volatile storage 342. The second information handling device 334 may interface with hardware devices 340A-N, non-volatile storage 342, a user input device 356, and/or an output interface 350 via a second software stack. In one embodiment the second software stack may include UEFI BIOS 344, HII data 346, and a HII browser 348. In an embodiment, the information handling system configuration settings 352 corresponding to UEFI BIOS 344 may be stored in non-volatile storage 342.

In one embodiment, apparatus 300 may also include a mobile device 326 configured to capture an image of QR code 324 via camera 328. Mobile device 326 may utilize an integrated display 330 to display a QR code image 332, where QR code image 332 corresponds to the captured image of QR code 324. In an embodiment a user of apparatus 300 may then hold mobile device 326 within the field of view of camera 338 of second information handling device 334, such that camera 338 may read QR code image 332. Logic unit 336 may decode QR code image 332 and utilize the decoded data to adjust information handling system configuration settings 352, thereby matching information handling system configuration settings 352 to information handling system configuration settings 322 of the first information handling device 302.

In an embodiment, logic unit 336 may compare each of the one or more information handling system configuration settings 322 decoded from the first information handling device 302 based on QR code image 332 to one or more information handling system configuration settings 352 of the second information handling device 334. Logic unit 336 may skip or ignore one or more of the decoded information handling system configuration settings 322 that do not apply to the attributes of second information handling device 334 and/or hardware devices 340A-N. For example, logic unit 336 may not apply any non-applicable settings, and thus only update information handling system configuration settings 352 based on one or more applicable settings from the decoded information handling system configuration settings 322. In one embodiment logic unit 336 may send a signal to reboot (i.e., reinitialize) information handling device 334 when information handling system configuration settings 352 are adjusted to match the information handling system configuration settings from the first information handling device 302. In one embodiment, logic unit 336 of the second information handling device 334 may also refresh QR code 354 in response to changes in one or more of information handling system configuration settings 352.

In another embodiment logic unit 304 may refresh QR code 324 in real time in response to changes in one or more of information handling system configuration settings 322. Similarly, logic unit 304 may generate QR code 324 in response to a scan of configuration data from UEFI HII data 314. In various embodiments, information handling system configuration settings 322 and/or information handling system configuration settings 352 may include BIOS settings, baseboard management controller (BMC) settings, chassis management controller (CMC) settings, and/or modular server management controller settings.

In an alternate embodiment, QR code image 332 may be included on a hardcopy printed medium. For example, a user of information handling device 302 may navigate to QR code 324 and send a print command via user input device 318 that results in one of hardware devices 308A-N printing a piece of paper including QR code image 332. The user may then hold the printed paper having the QR code image 332 within the field of view of camera 338 of the second information handling device 334 in order to facilitate the copying of information handling system configuration settings 322 from the first information handling device 302 to the second information handling device 334.

Figure 4:
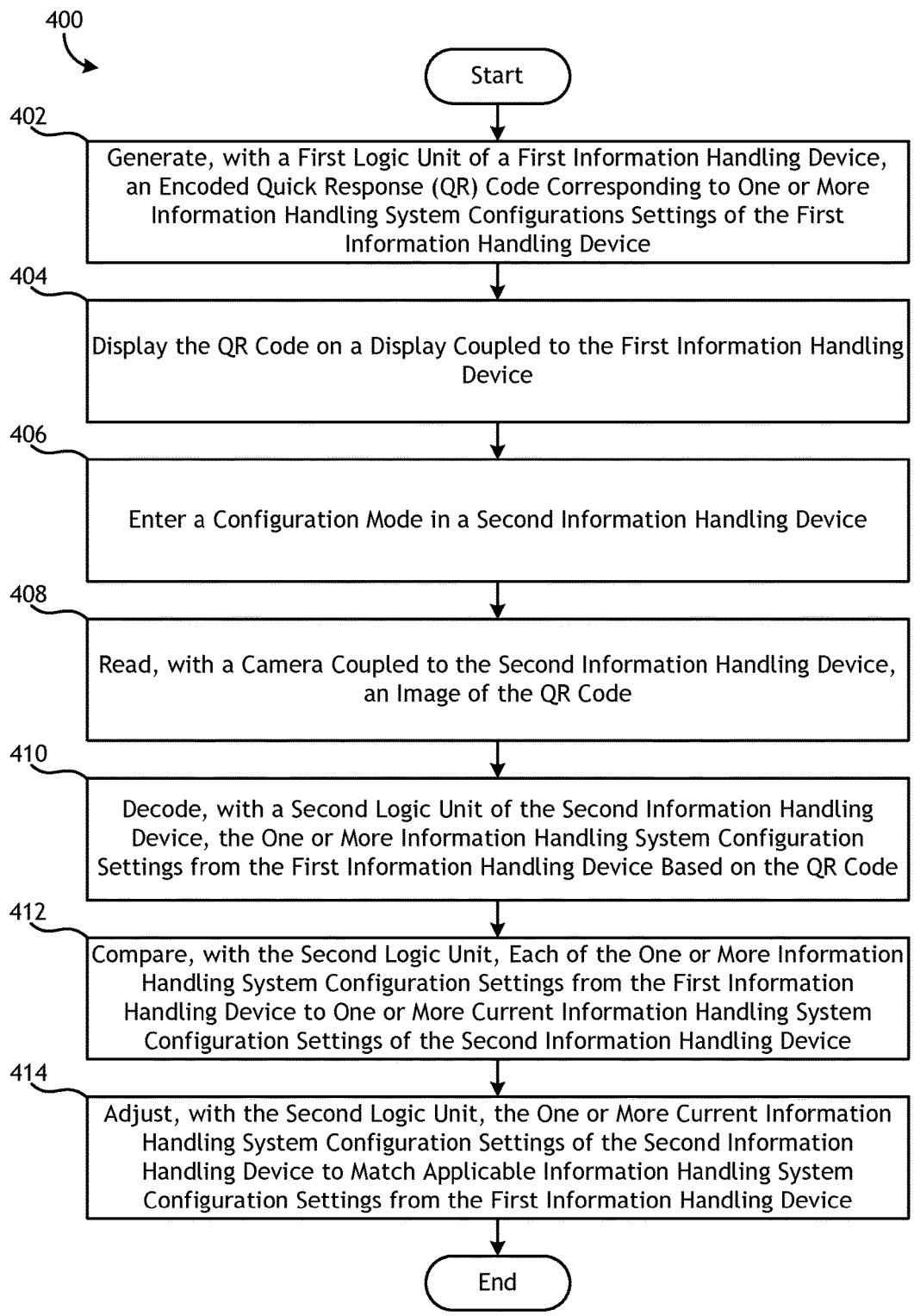
FIG. 4 is a schematic flowchart diagram illustrating one embodiment of a method to copy IHS configuration information.

FIG. 4 is a schematic flowchart diagram illustrating one embodiment of a method 400 to copy IHS configuration information. At block 402, the method 400 includes a first logic unit 304 of a first information handling device 302 generating an encoded QR code 324 corresponding to one or more information handling system configuration settings 322 of the first information handling device 302. As shown in block 404, the first logic unit 304 displays the QR code 324 on a display, such as output interface 320, coupled to the first information handling device 302.

As depicted in block 406, a second logic unit 336 of a second information handling device 334 enters the second information handling device 334 into a configuration mode in response to a command entered by a user via user input device 356. As shown in block 408, the second logic unit 336 uses camera 338 coupled to the second information handling device 334 to read an image of the QR code 332. At block 410 the second logic unit 336 decodes the one or more information handling system configuration settings 322 from the first information handling device 302 based on the image of the QR code 332.

As shown in block 412, the second logic unit 336 compares each of the one or more information handling system configuration settings 322 from the first information handling device 302 to one or more current information handling system configuration settings 352 of the second information handling device 334. As depicted in block 414, the second logic unit 336 adjusts the one or more current information handling system configuration settings 352 of the second information handling device 334 to match one or more applicable information handling system configuration settings 322 from the first information handling device 302. In one embodiment the second logic unit 336 may skip or ignore one or more of the decoded information handling system configuration settings 322 that do not apply to the attributes of second information handling device 334 and/or hardware devices 340A-N.

Figure 5:
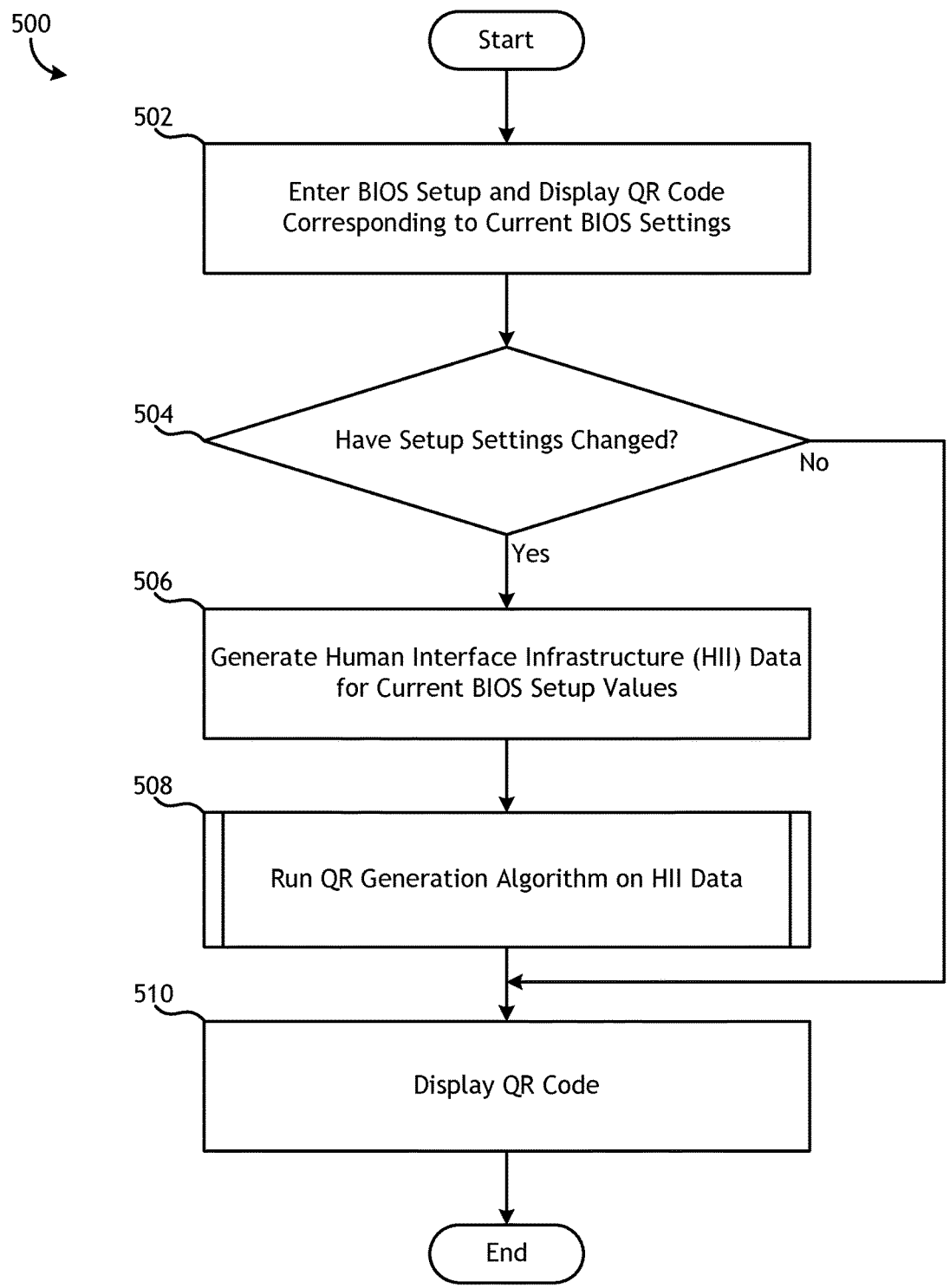
FIG. 5 is a schematic flowchart diagram illustrating one embodiment of a method to copy IHS configuration information.

FIG. 5 is a schematic flowchart diagram illustrating one embodiment of a method 500 to copy IHS configuration information. At block 502, the method 500 includes a first logic unit 304 of a first information handling device 302 entering the first information handling device 302 into a BIOS setup mode in response to a command entered by a user via user input device 318 and displaying a QR code 324, which corresponds to the current BIOS information handling settings of first information handling device 302, on an output interface 320. At block 504 the first logic unit 304 determines whether the BIOS settings of first information handling device 302 have been changed since the QR code 324 was last updated. If the BIOS settings have not changed (i.e., if QR code 324 still represents the encoded version of the most recent BIOS settings), the first logic unit 304 continues to display the QR code 324 via output interface 320, as depicted in block 510.

If the BIOS settings have changed, the first logic unit 304 generates HII data 314 corresponding to the most recent BIOS setup values, such as UEFI BIOS settings 312, as shown in block 506. As depicted in block 508, the first logic unit 304 executes a QR code generation algorithm to generate an encoded QR code 324 that represents the most recent HII data 314. As shown in block 510, the first logic unit 304 displays the updated QR code 324 via output interface 320.

Figure 6:
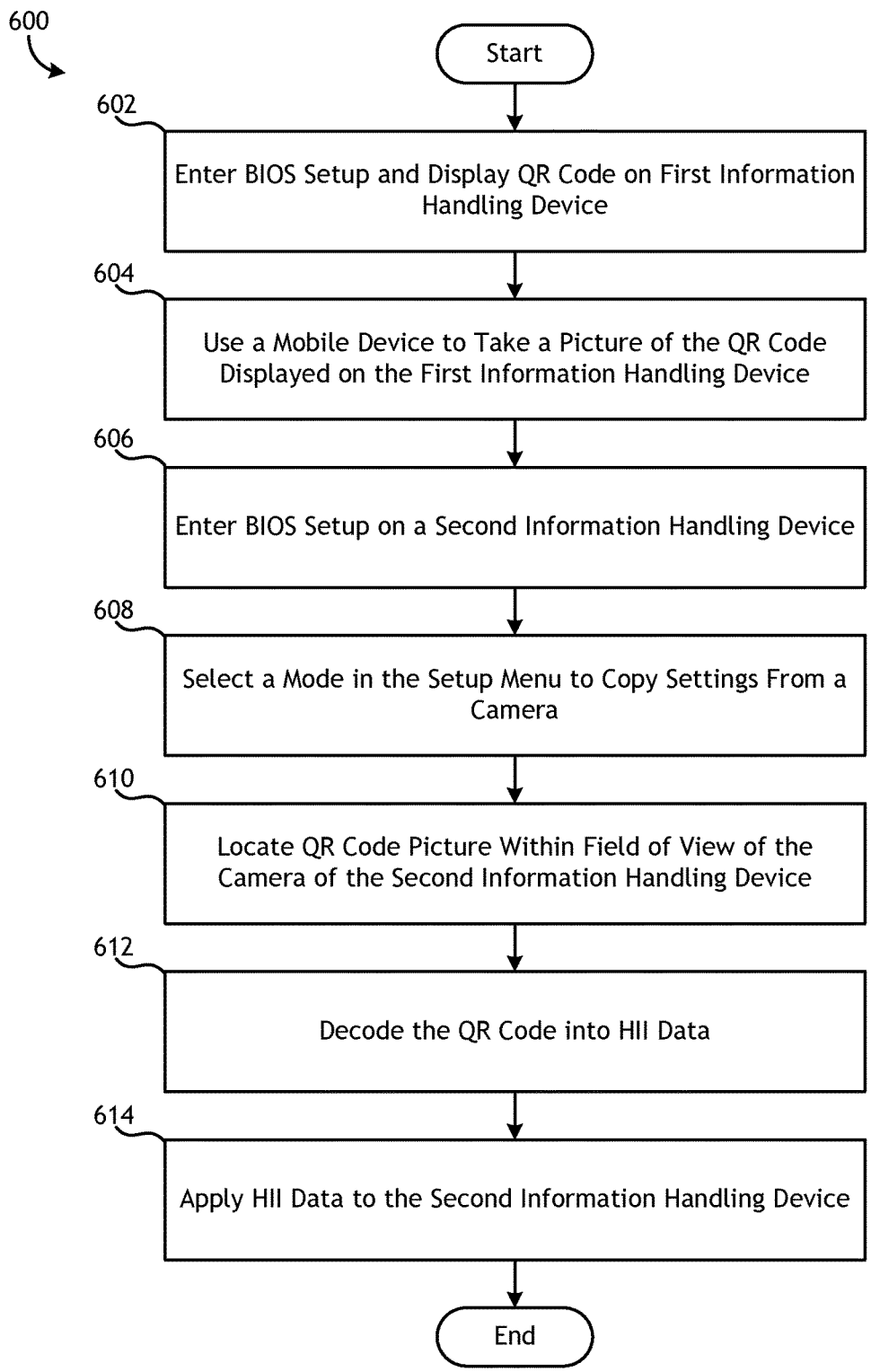
FIG. 6 is a schematic flowchart diagram illustrating one embodiment of a method to copy IHS configuration information.

FIG. 6 is a schematic flowchart diagram illustrating one embodiment of a method 600 to copy IHS configuration information. At block 602, the method 600 includes a first logic unit 304 of a first information handling device 302 entering the first information handling device 302 into a BIOS setup mode in response to a command entered by a user via user input device 318 and displaying a QR code 324, which corresponds to the current BIOS settings of first information handling device 302, on an output interface 320. As shown in block 604, a user of a mobile device 326 may use a camera 328 connected to the mobile device 326 to take a picture 332 of the QR code 324 that is being displayed by the first information handling device 302.

As depicted in block 606, a second logic unit 336 of a second information handling device 334 enters the second information handling device 334 into a BIOS setup mode in response to a command entered by a user via user input device 356. As shown in block 608, the user may select a mode in the BIOS setup menu to copy BIOS settings from a camera 338 connected to the second information handling device 334. At block 610, the method 600 includes the user holding mobile device 326, which is displaying picture 332, within the field of view of camera 338, and second logic unit 336 reading the picture 332 of the QR code 324 from the display 330 of the mobile device 326. As depicted in block 612, the second logic unit 336 decodes the received image of QR code 324 into data corresponding to HII data 314. At block 614 the second logic unit 336 applies the decoded HII data to the second information handling device 334 by updating HII data 346. The information handling system configuration settings 352, of the second information handling device 334 are thereby updated to match the information handling system configuration settings 322 of the first information handling device 302.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of copying information handling system hardware initialization configuration settings between information handling devices comprising:
    generating, with a first logic unit of a first information handling device, an encoded Quick Response (QR) code corresponding to one or more information handling system hardware initialization configuration settings for a firmware interface of the first information handling device;
    displaying the QR code on a display coupled to the first information handling device, for reading by a camera coupled to a second information handling device in a firmware configuration mode to update only settings determined, by the second information handling device, to be applicable information handling system hardware initialization configuration settings for a firmware interface of the second information handling device;
    refreshing, with the first logic unit, the QR code in real time, in response to changes in the one or more information handling system hardware initialization configuration settings of the first information handling device;
    comparing, with a second logic unit of the second information handling device, each of the one or more information handling system hardware initialization configuration settings from the first information handling device to one or more current information handling system hardware initialization configuration settings of the second information handling device; and
    adjusting, with the second logic unit, the one or more current information handling system hardware initialization configuration settings of the second information handling device to match only settings determined, by the second information handling device, to be applicable information handling system hardware initialization configuration settings from the first information handling device.

2. The method of claim 1, wherein the one or more information handling system hardware initialization configuration settings comprise Basic Input/Output System (BIOS) settings.

3. The method of claim 1, wherein the one or more information handling system hardware initialization configuration settings comprise Baseboard Management Controller (BMC) settings.

4. The method of claim 1, wherein the one or more information handling system hardware initialization configuration settings comprise modular server management controller settings.

5. The method of claim 1, further comprising generating, with the first logic unit, the QR code in response to a scan of configuration data from a Unified Extensible Firmware Interface (UEFI) Human Interface Infrastructure (HII) database.

6. The method of claim 1, further comprising entering the firmware configuration mode in the second information handling device.

7. The method of claim 1, further comprising reading, with a camera coupled to the second information handling device in the firmware configuration mode, an image of the QR code.

8. The method of claim 7, further comprising decoding, with the second logic unit of the second information handling device, the one or more information handling system hardware initialization configuration settings from the first information handling device based on the QR code.

9. The method of claim 8, further comprising sending, with the second logic unit, a signal to reboot the second information handling device.

10. The method of claim 6, further comprising reading, with the camera, the image of the QR code from a display of a mobile device held within a field of view of the camera by a user.

11. An apparatus for copying information handling system hardware initialization configuration settings between information handling devices comprising:
   a processor comprising a first logic unit configured to generate an encoded Quick Response (QR) code corresponding to one or more information handling system hardware initialization configuration settings for a firmware interface of the first information handling device; and
   an output interface comprising a display coupled to the first logic unit, the output interface configured to generate an output comprising the QR code, for reading by a camera coupled to a second information handling device in a firmware configuration mode to update only settings determined, by the second information handling system device, to be applicable information handling system hardware initialization configuration settings for a firmware interface of the second information handling device,
   wherein the first logic unit is further configured to refresh the QR code in real time, in response to changes in the one or more information handling system hardware initialization configuration settings of the first information handling device,
   wherein a second logic unit of the second information handling device is configured to compare each of the one or more information handling system hardware initialization configuration settings from the first information handling device to one or more current information handling system hardware initialization configuration settings of the second information handling device, and
   wherein the second logic unit is further configured to adjust the one or more current information handling system hardware initialization configuration settings of the second information handling device to match only settings determined, by the second information handling device, to be applicable information handling system hardware initialization configuration settings from the first information handling device.

12. The apparatus of claim 11, wherein the first logic unit generates the QR code in response to a scan of configuration data from a Unified Extensible Firmware Interface (UEFI) Human Interface Infrastructure (HII) database.

13. An apparatus for copying information handling system hardware initialization configuration settings between information handling devices comprising:
   a camera configured to read an image of a QR code, wherein the QR code corresponds to one or more information handling system hardware initialization configuration settings for a first firmware interface of a first information handling device, wherein the QR code is generated by a first logic unit in the first information handling device, while a second information handling device coupled to the camera is in a firmware configuration mode; and
   a processor comprising second logic unit configured to decode the one or more information handling system hardware initialization configuration settings from the QR code, wherein the second logic unit adjusts information handling system hardware initialization configuration settings for a second firmware interface of the second information handling device to match only settings determined, by the second logic unit, to be applicable settings of the one or more information handling system hardware initialization configuration settings for the first firmware interface of the first information handling device applicable to the second firmware interface of the second information handling device, while the second information handling device is in the firmware configuration mode,
   wherein the first logic unit is further configured to refresh the QR code in real time, in response to changes in the one or more information handling system hardware initialization configuration settings of the first information handling device,
   wherein the second logic unit of the second information handling device is further configured to compare each of the one or more information handling system hardware initialization configuration settings from the first information handling device to one or more current information handling system hardware initialization configuration settings of the second information handling device, and
   wherein the second logic unit of the second information handling device is further configured to adjust the one or more current information handling system hardware initialization configuration settings of the second information handling device to match only settings determined, by the second information handling device, to be applicable information handling system hardware initialization configuration settings from the first information handling device.

14. The apparatus of claim 13, wherein the camera reads the image of the QR code from a display of a mobile device held within a field of view of the camera by a user.

* * * * *